US011993381B2

(12) United States Patent
Guthrie

(10) Patent No.: US 11,993,381 B2
(45) Date of Patent: *May 28, 2024

(54) CONVERTIBLE INTERIOR FIXTURE WITH FOLDABLE CUSHION FOR A VEHICLE

(71) Applicant: Gulfstream Aerospace Corporation, Savannah, GA (US)

(72) Inventor: Joe Guthrie, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/933,379

(22) Filed: Sep. 19, 2022

(65) Prior Publication Data

US 2023/0021185 A1 Jan. 19, 2023

Related U.S. Application Data

(63) Continuation-in-part of application No. 16/949,120, filed on Oct. 14, 2020, now Pat. No. 11,447,251.

(60) Provisional application No. 62/916,986, filed on Oct. 18, 2019.

(51) Int. Cl.
*B64D 11/00* (2006.01)
*B64D 11/06* (2006.01)

(52) U.S. Cl.
CPC .......... *B64D 11/00* (2013.01); *B64D 11/0605* (2014.12); *B64D 11/0643* (2014.12); *B64D 11/0647* (2014.12)

(58) Field of Classification Search
CPC ............ B64D 11/0605; B64D 11/0643; B64D 11/0638
See application file for complete search history.

(56) References Cited

U.S. PATENT DOCUMENTS

| 11,447,251 B2 * | 9/2022 | Guthrie ............. B64D 11/0605 |
| 2005/0252429 A1 | 11/2005 | Logan et al. |
| 2011/0203496 A1 | 8/2011 | Garneau et al. |
| 2016/0088951 A1 | 3/2016 | Mcguinness |
| 2019/0083345 A1 | 3/2019 | Romano et al. |

FOREIGN PATENT DOCUMENTS

| GB | 2527615 A | 12/2015 |
| WO | 2010131014 A1 | 11/2010 |

* cited by examiner

*Primary Examiner* — Timothy D Collins
*Assistant Examiner* — Justin Michael Heston
(74) *Attorney, Agent, or Firm* — Lorenz & Kopf, LLP

(57) ABSTRACT

A configurable interior fixture for a vehicle includes a base assembly, a table assembly and a stowable cushion. The foldable cushion includes first and second pad portions pivotally connected along a medial edge with a hinge assembly and a collapsible sleeve forming an interior cavity configured to receive the table assembly when the foldable cushion is in a use state. The collapsible sleeve is disposed in a gap formed between the first and second pad section when the foldable cushion is in a folded state. The interior fixture may be configured as an ottoman by lowering the base assembly, folding the table assembly and attaching the foldable cushion to the table assembly. The interior fixture may be configured as a table by raising the base assembly, detaching the foldable cushion from the table assembly, then folding and stowing the foldable cushion.

20 Claims, 17 Drawing Sheets

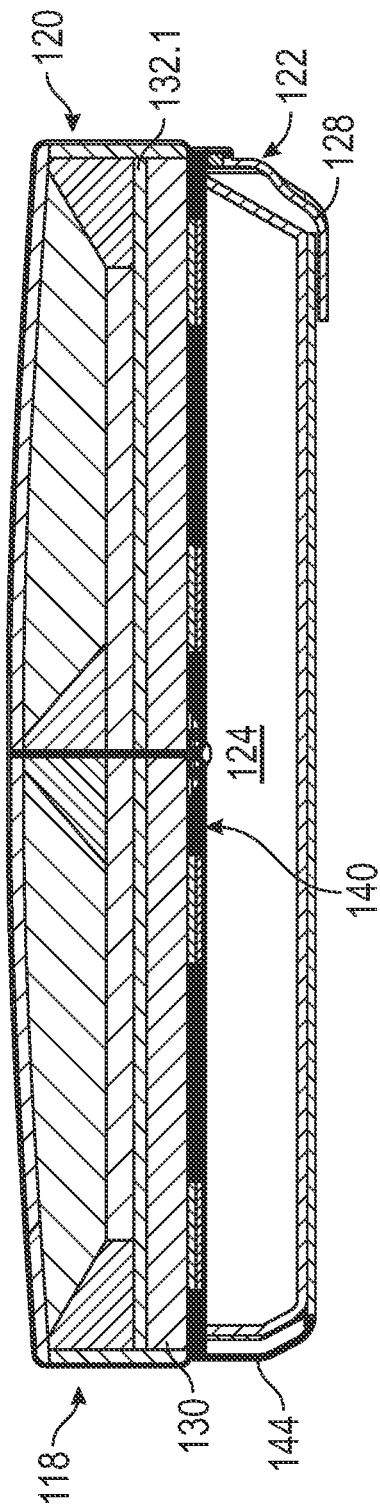
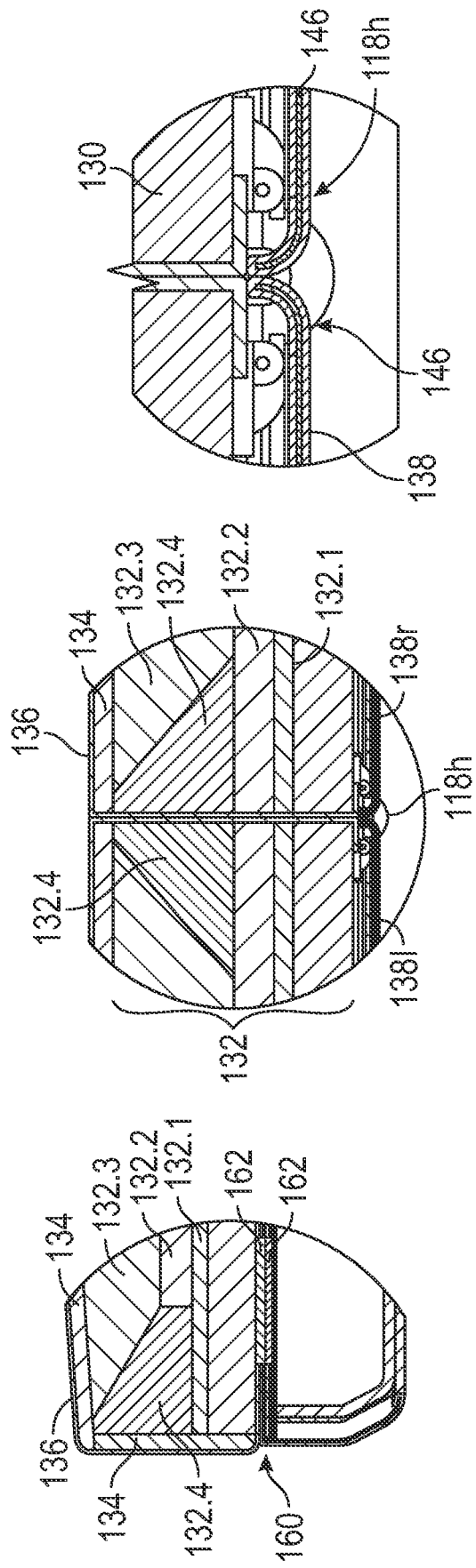
FIG. 18
FIG. 19
FIG. 20
FIG. 21

CONVERTIBLE INTERIOR FIXTURE WITH FOLDABLE CUSHION FOR A VEHICLE

CROSS-REFERENCE TO RELATED APPLICATIONS

This application is a continuation in part of U.S. application Ser. No. 16/949,120 filed on Oct. 14, 2020, which claims the benefit of U.S. Provisional Application No. 62/916,986, filed on Oct. 18, 2019. The entire disclosure of the above-identified applications are incorporated herein by reference.

TECHNICAL FIELD

The present disclosure relates generally to an interior fixture in a vehicle, and more particularly relates to an interior fixture which provides an ottoman in a first configuration having a foldable cushion or a table in a second configuration.

BACKGROUND

This section provides background information related to the present disclosure which is not necessarily prior art.

Providing an adaptable interior configuration with various functions and features is of interest for many vehicle manufacturers. For example, in an aircraft, it is desirable to provide a configurable seating arrangement such that passenger may relax with their feet in an elevated position or provide a horizontal surface adjacent the seating arrangement for working or eating. However, space is limited and providing such functionality on board an aircraft consumes a significant amount of cabin space.

Accordingly, it is desirable to provide an interior fixture for a vehicle that is convertible from an ottoman to a table that addresses one or more of the foregoing issues. Furthermore, other desirable features and characteristics of the various embodiments described herein will become apparent from the subsequent detailed description and the appended claims, taken in conjunction with the accompanying drawings and this background.

SUMMARY

The present disclosure is directed to a configurable interior fixture for a vehicle having a base assembly, a table assembly and a stowable cushion. The base assembly is positionable between a lowered position and a raised position. The table assembly includes a center leaf section supported on the base assembly and a side leaf section that is moveable between a stowed position and a use position. The stowable cushion has a pad section and a collapsible sleeve forming an interior cavity configured to receive the table assembly when the stowable cushion is in a use state. The interior fixture may be configured as a foot rest by lowering the base assembly, folding the table assembly and attaching the stowable cushion to the table assembly. The interior fixture may be configured as a table by raising the base assembly, detaching the foldable cushion from the table assembly, then folding and stowing the foldable cushion.

BRIEF DESCRIPTION OF THE DRAWINGS

The various embodiments will hereinafter be described in conjunction with the following drawing figures, wherein like numerals denote like elements, and wherein:

FIG. 18 is a center longitudinal cross-section of the ottoman;

FIG. 19 is a corner detail of the longitudinal cross-section shown in FIG. 18;

FIG. 20 is a midsection detail of the longitudinal cross-section shown in FIG. 18;

FIG. 21 is a detail view of the hinge taken along the longitudinal cross-section shown in FIG. 18;

Corresponding reference numerals indicate corresponding parts throughout the several views of the drawings.

DETAILED DESCRIPTION

The following Detailed Description is merely exemplary in nature and is not intended to limit the various embodiments or the application and uses thereof. Furthermore, there is no intention to be bound by any theory presented in the preceding background or the following detailed description.

Figure 1:
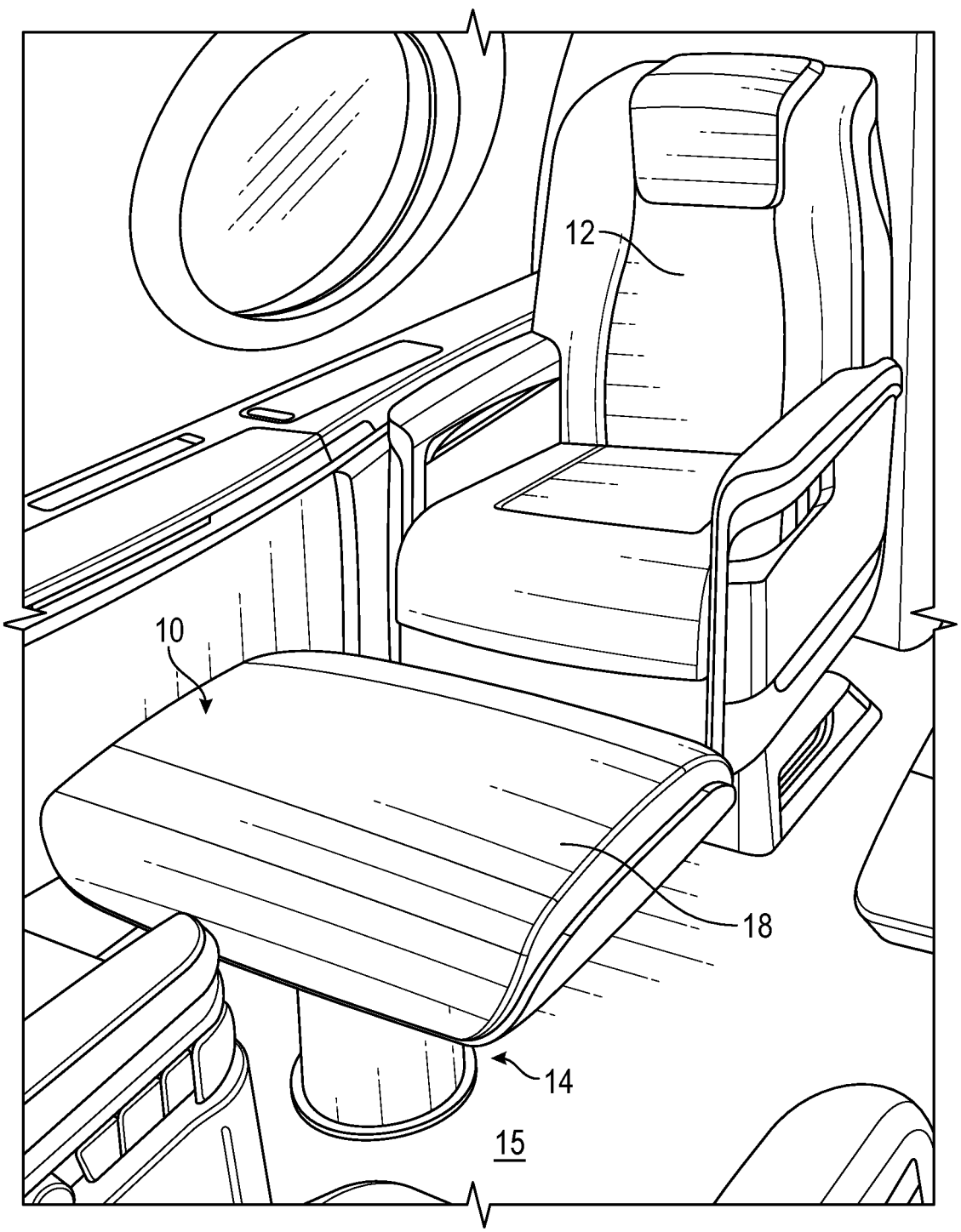
FIG. 1 is a perspective view of an interior area of an aircraft including a seating arrangement having an ottoman.
Figure 2:
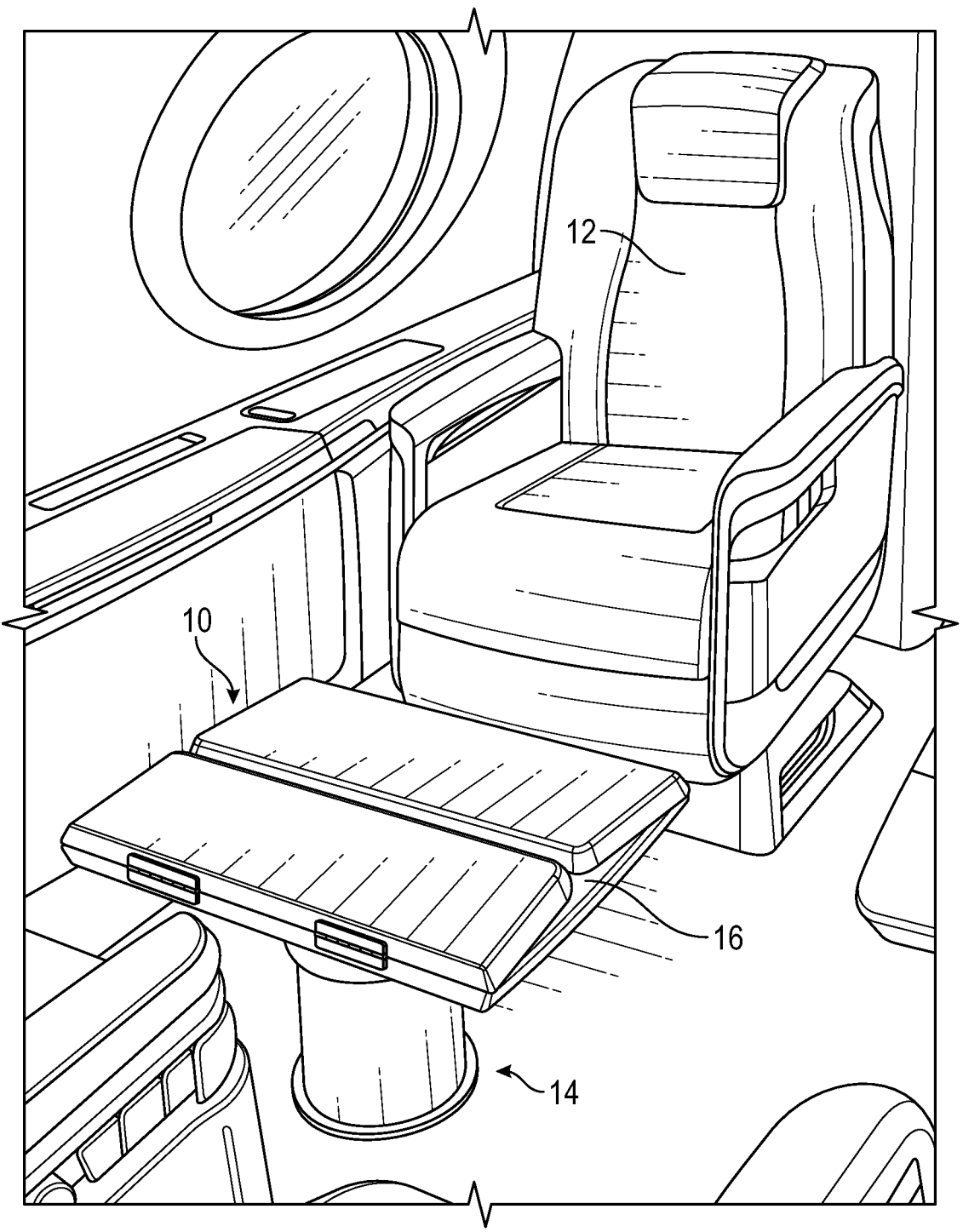
FIG. 2 is a perspective view similar to that shown in FIG. 1 with an ottoman cushion removed to expose a table assembly in a lowered, stowed position.
Figure 3:
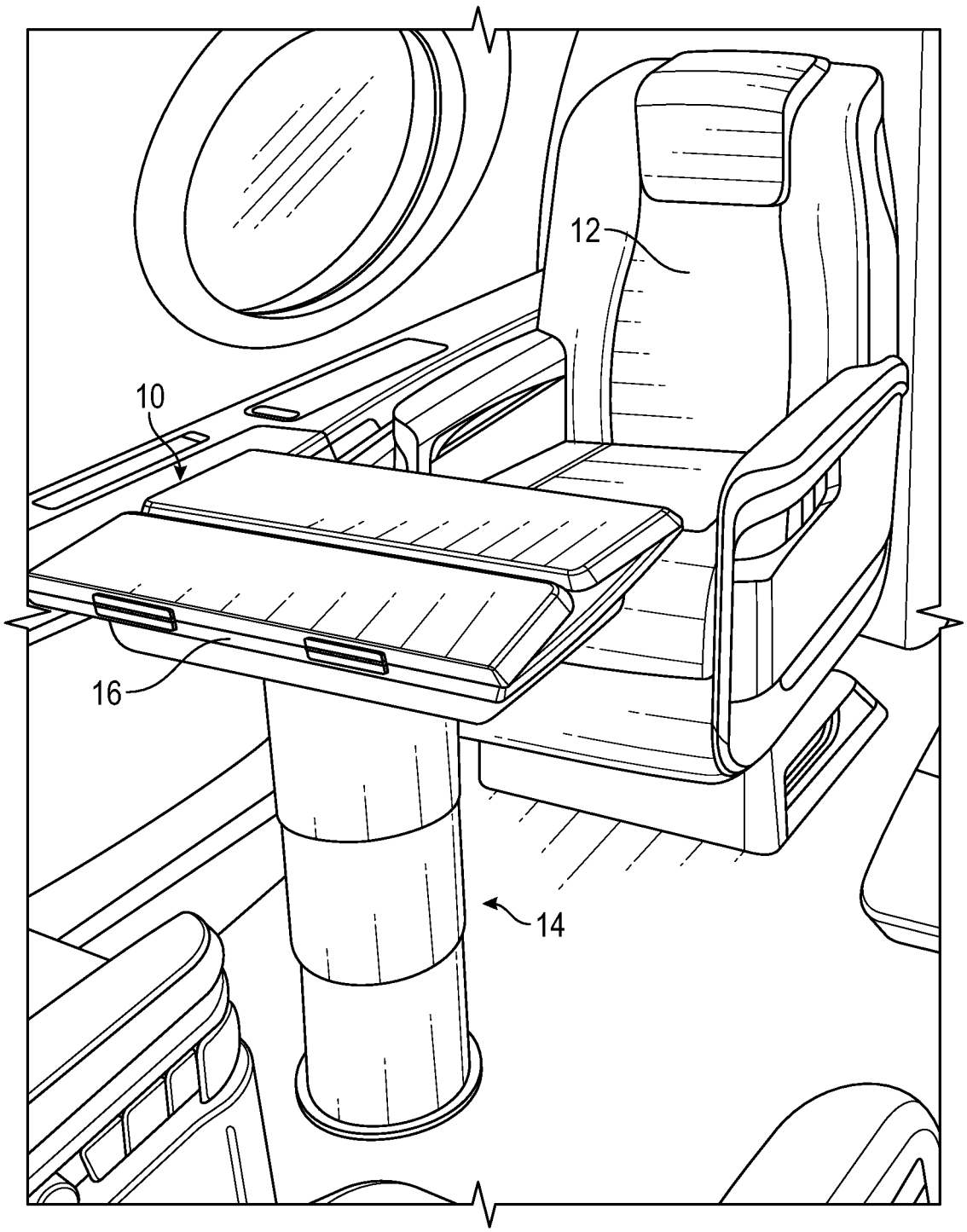
FIG. 3 is a perspective view similar to that shown in FIG. 2 with the table assembly in a raised, stowed position.
Figure 4:
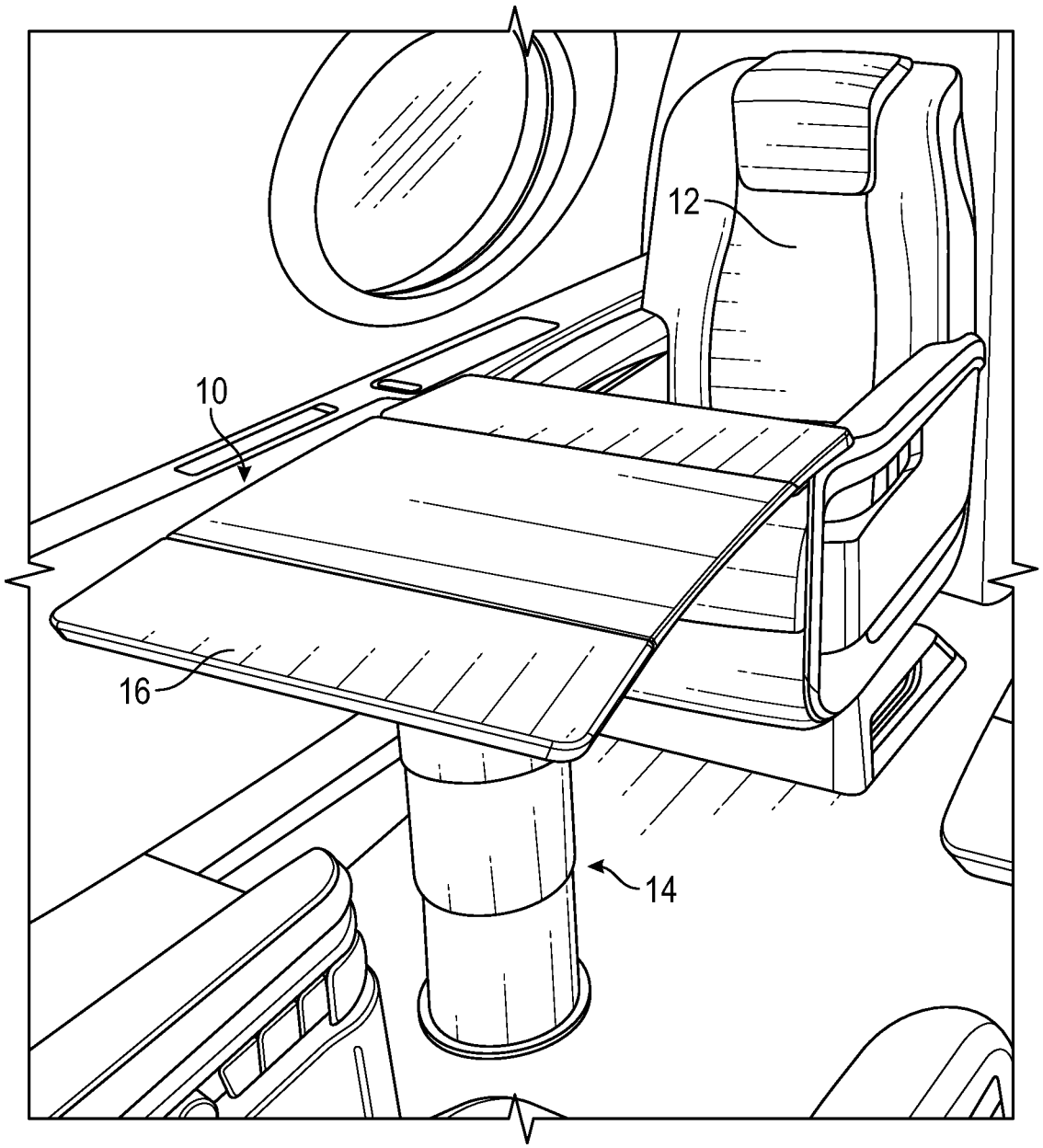
FIG. 4 is a perspective view similar to that shown in FIG. 4 with the table assembly in a raised, extended position.
Figure 5:
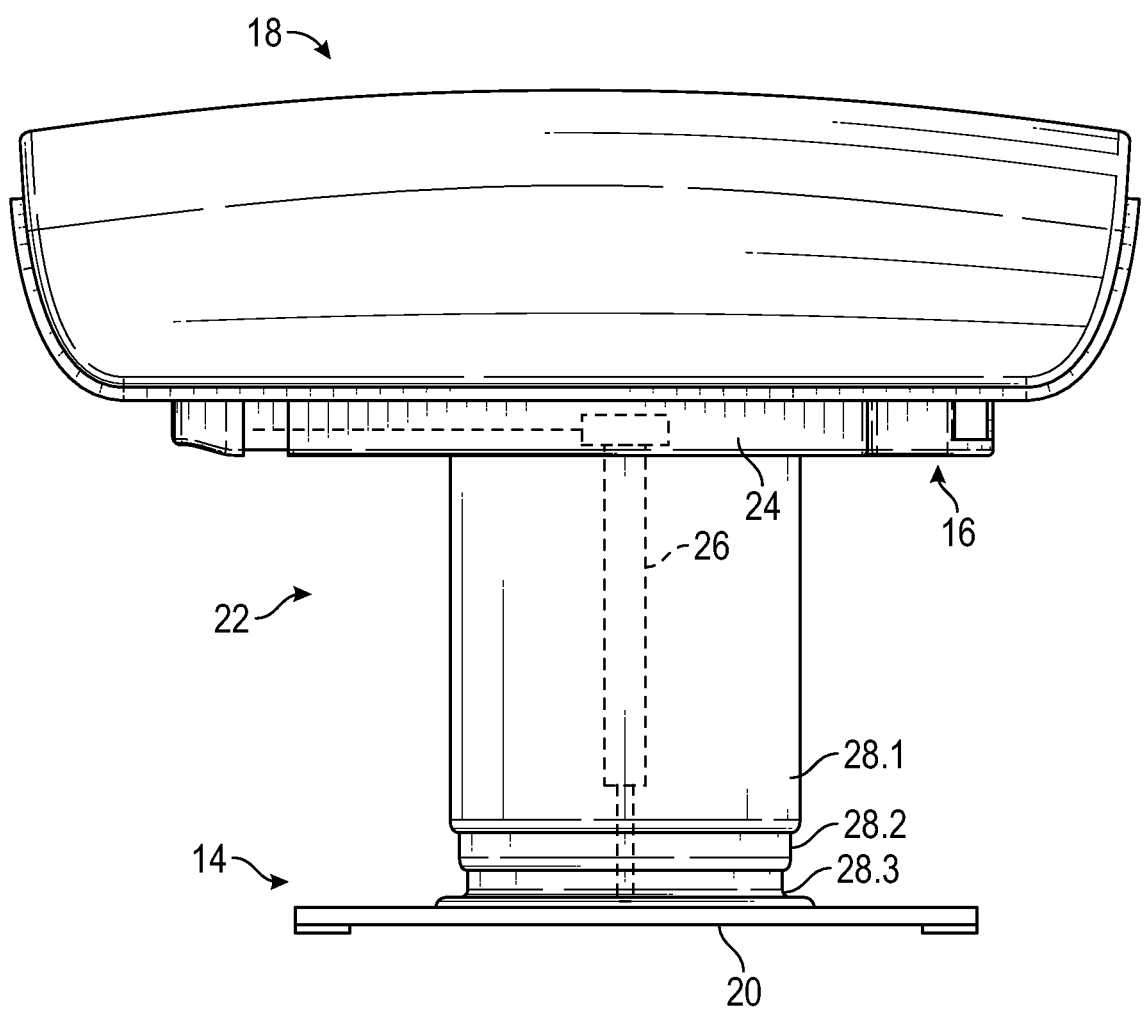
FIG. 5 is a front elevational view of the ottoman.
Figure 6:
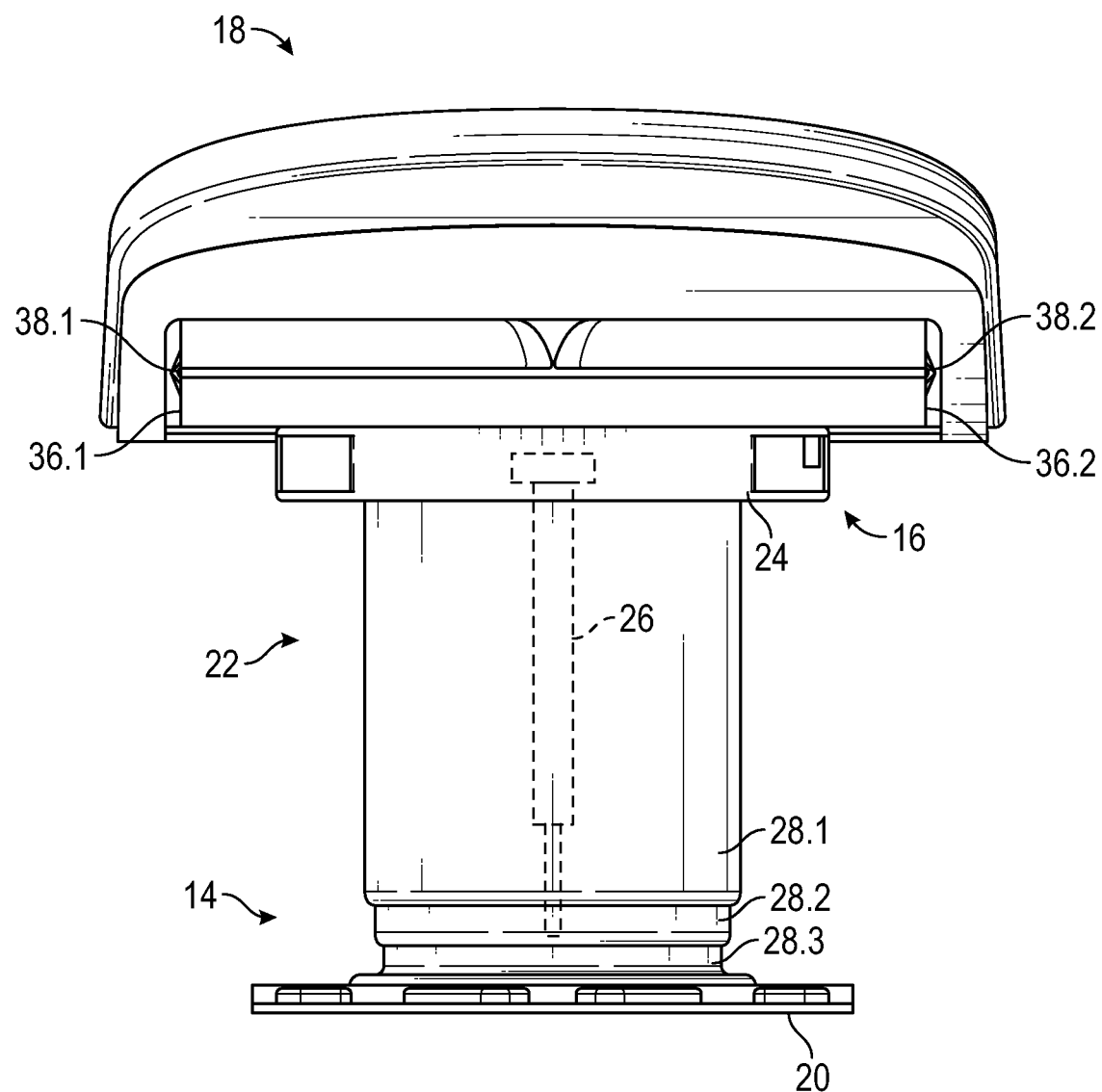
FIG. 6 is an end view of the ottoman.

With reference to FIGS. 1-4, an exemplary embodiment described herein provides an interior fixture 10 adjacent a seating arrangement 12 in a vehicle, such as, for example an aircraft. The interior fixture 10 includes a base assembly 14 that is positionable between a lowered position and a raised position relative to the floor 15 of the vehicle, a table assembly 16 supported on the base assembly 14 that is collapsible from a use position to a stowed position, and an ottoman cushion 18 that is removably attached to the table assembly. In the lowered position, the table assembly 16 may be in the stowed position and covered by the ottoman cushion 18 for providing an upholstered footrest adjacent the seating arrangement 12 as shown in FIG. 1. Alternately, in the lowered position the ottoman cushion 18 may be removed with the table assembly 16 in the stowed position to provide an occasional table as shown in FIG. 2. From this position, the base assembly 14 is positioned to the raised position as shown in FIG. 3 and the table assembly 16 is into the use position for providing a working surface adjacent the seating arrangement as shown in FIG. 4.

With reference now to FIGS. 5-8, the base assembly 14 includes a base plate 20 configured to attach the interior fixture 10 to the floor 15 of the vehicle. An adjustable length post 22 secured at a first end to the base plate 20 and extends upwardly therefrom. A platform 24 is secured at a second end of the post 22 opposite the base plate 20. The adjustable length post 22 includes a height adjustment mechanism 26 surrounded by a plurality of cylindrical members 28.1, 28.2, 28.3 that slide one within another in a telescopic manner for providing a telescoping cover 28. The telescoping cover 28 extends downwardly from the platform 16 over the height adjustment mechanism 26 and onto the base 20. Thus, the length of the telescoping cover 28 is capable of being extended and retracted in coordination with changing the length of the height adjustment mechanism 26. The height adjustment mechanism 26 may be an electrically driven mechanism, a pneumatically driven mechanism or hydraulically driven mechanism operable to position the interior fixture between the lowered position and the raised position. A control element 30 is operably coupled to the height adjustment mechanism 26 for actuating the height adjustment of the interior fixture 10. In one embodiment, the height adjustment mechanism 26 is a pneumatic gas strut and the control element 30 is a valve assembly operated by a handle disposed on the platform.

The table assembly 16 including a center leaf section 32 attached to a top surface of the platform 24. A first side leaf section 34.1 is attached to the center leaf section along a first transverse edge 36.1 by a first hinge member 38.1. A second side leaf section 34.2 is attached to the center leaf section 32 along a second transverse edge 36.2 by a second hinge member 38.2. The side leaf sections 36 may be rotated inwardly on top of the center leaf section 32 when the table assembly 16 is in a stowed position. The side leaf section 36 may be rotated outwardly so that they extend from the transverse edges 36 of the center leaf section 32 to form a generally planar work surface therewith. The hinges 38 are configured to adequate support to prevent sagging of the side leaf section 34 when they are deployed in the use position.

Figure 7:
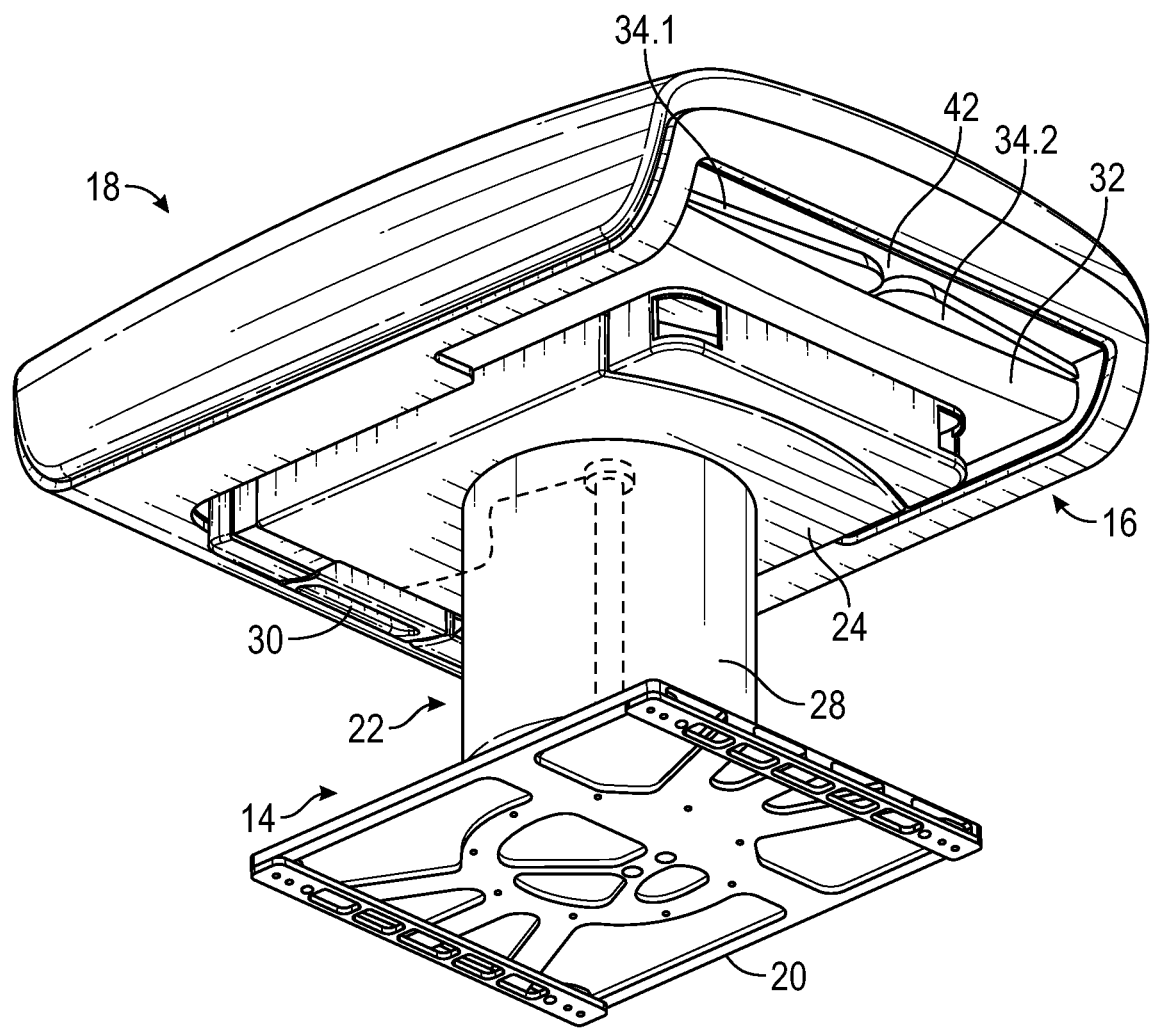
FIG. 7 is a lower perspective view of the ottoman showing the ottoman cushion in an installed state.
Figure 8:
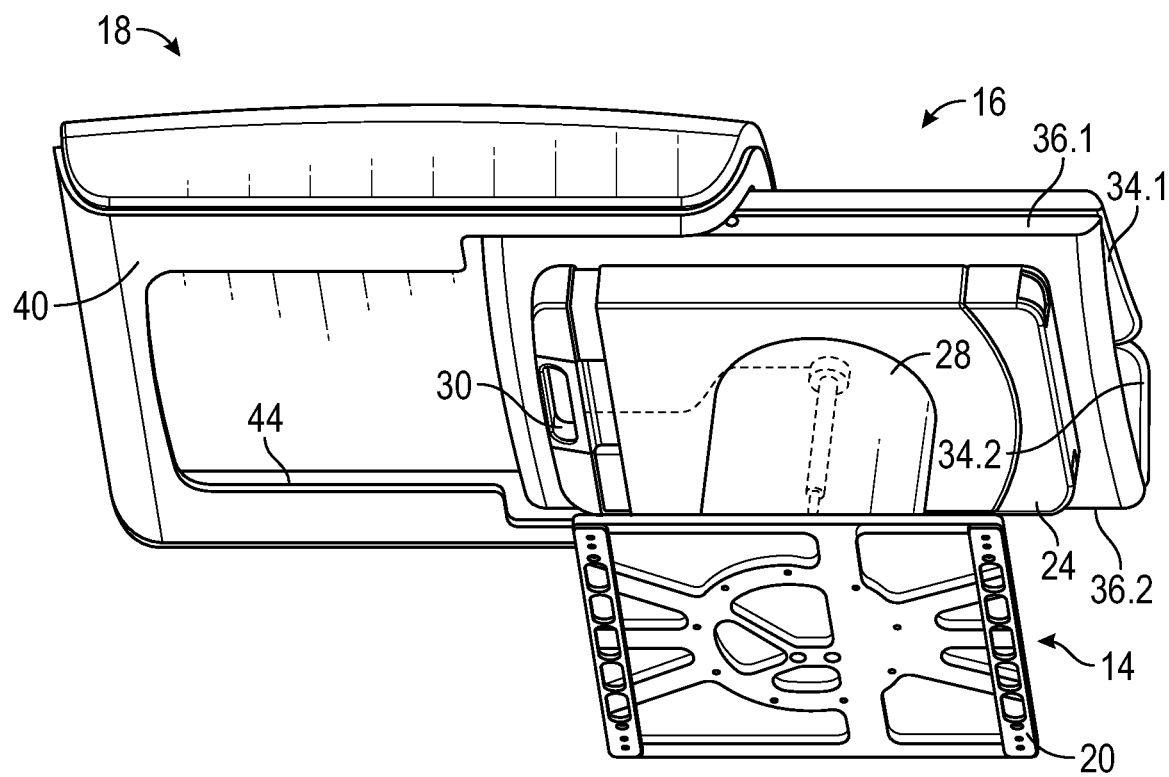
FIG. 8 is a lower perspective view similar to FIG. 7 showing the ottoman cushion being removed from a table base assembly.
Figure 9:
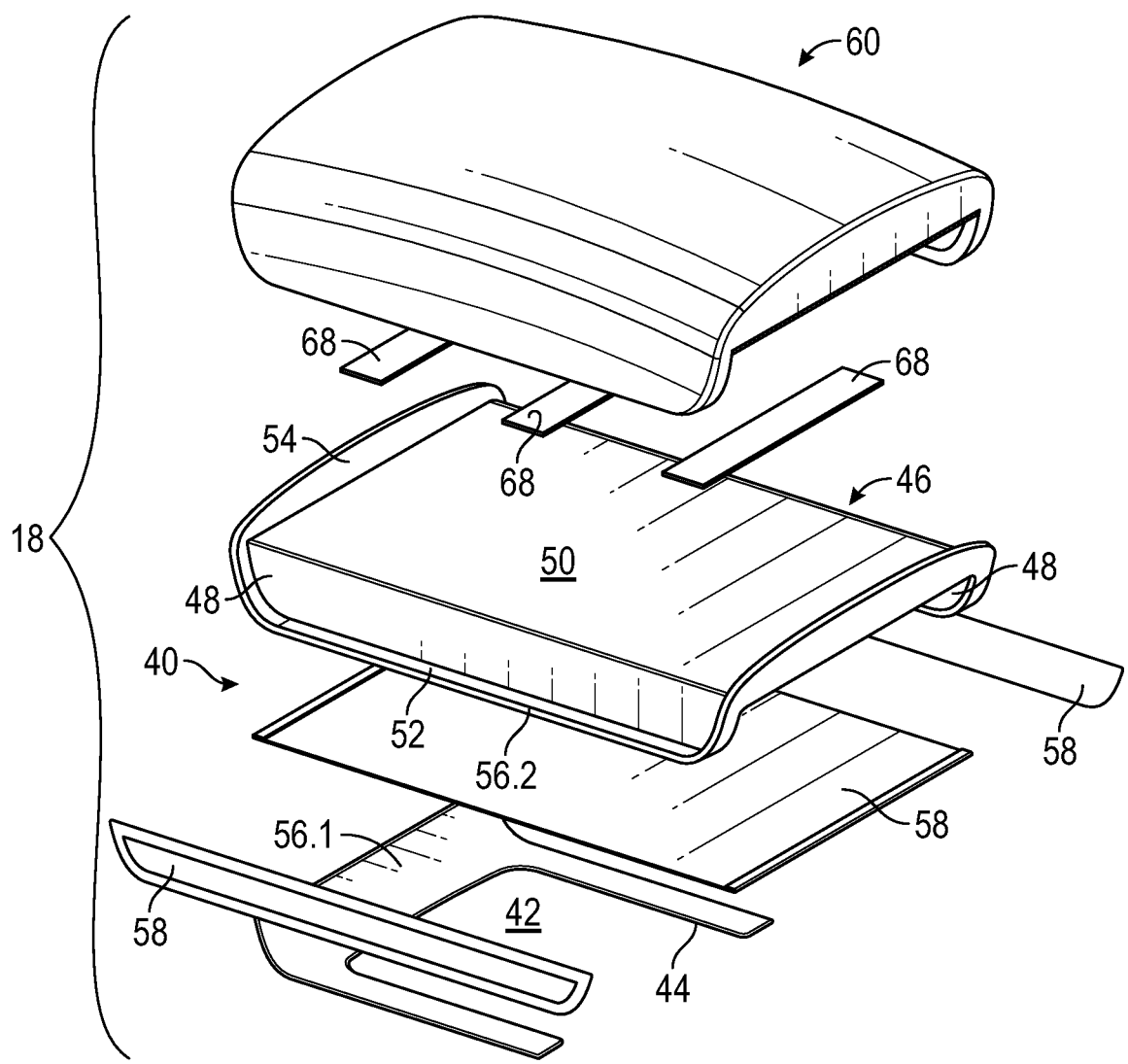
FIG. 9 is an expanded view showing the components of the ottoman cushion.
Figure 10:
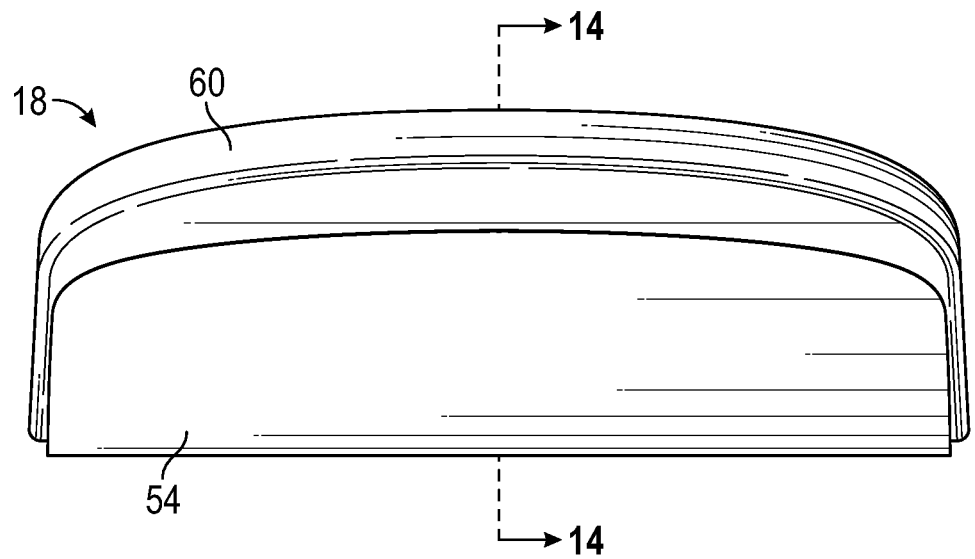
FIG. 10 is a right-end view of the ottoman cushion.
Figure 11:
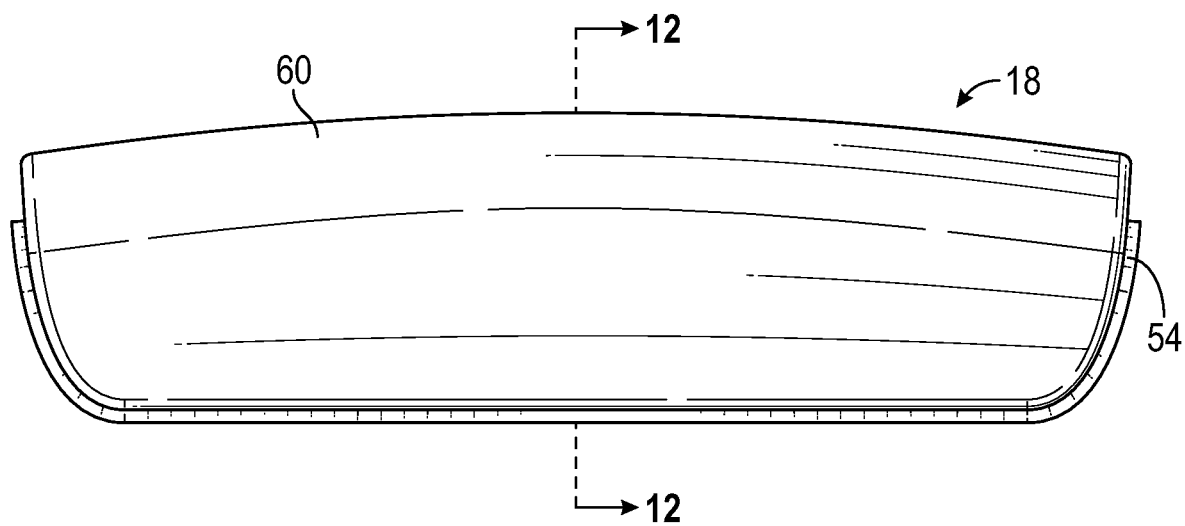
FIG. 11 is a front elevational view of the ottoman cushion.
Figure 12:
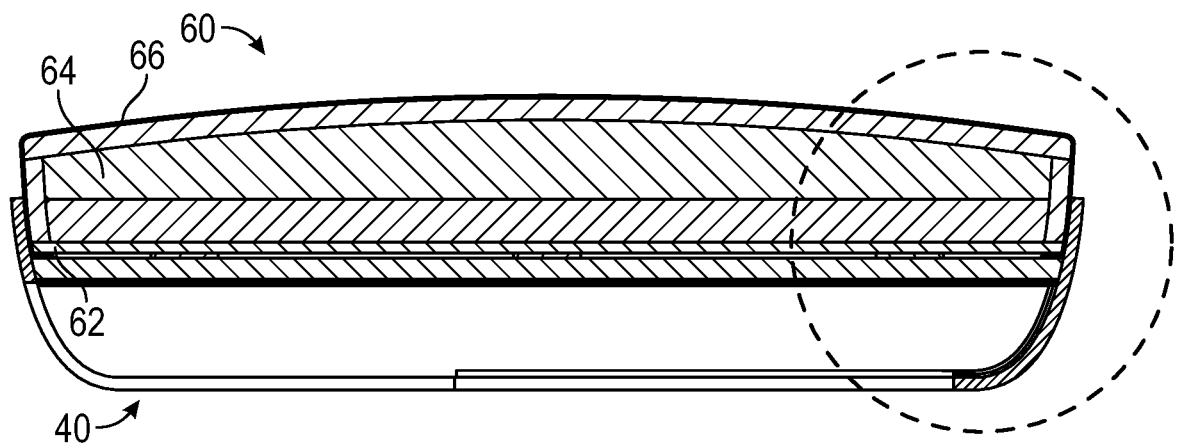
FIG. 12 is a cross section of the ottoman cushion taken through 12-12 in FIG. 10.
Figure 13:
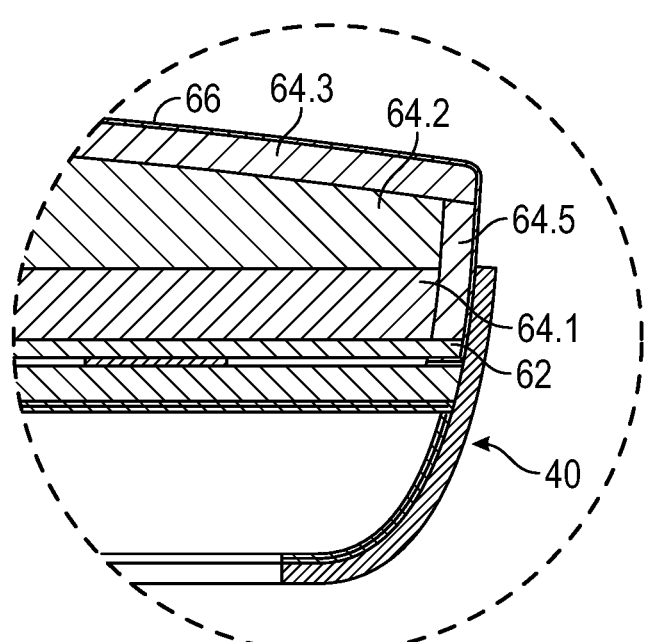
FIG. 13 is a detail within the broken line shown in FIG. 12.
Figure 14:
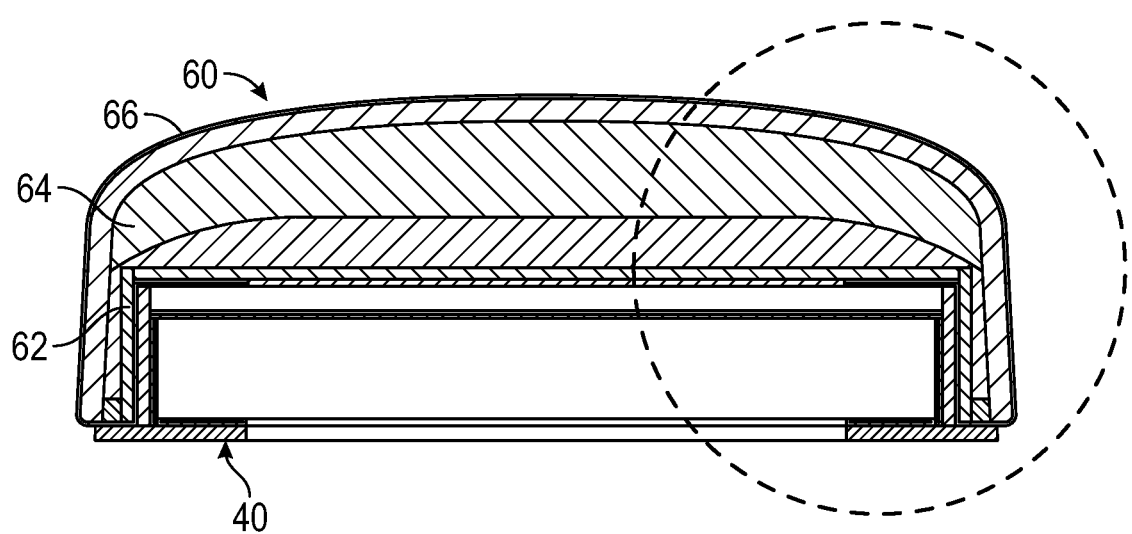
FIG. 14 is a cross section of the ottoman cushion taken through 14-14 in FIG. 11.
Figure 15:
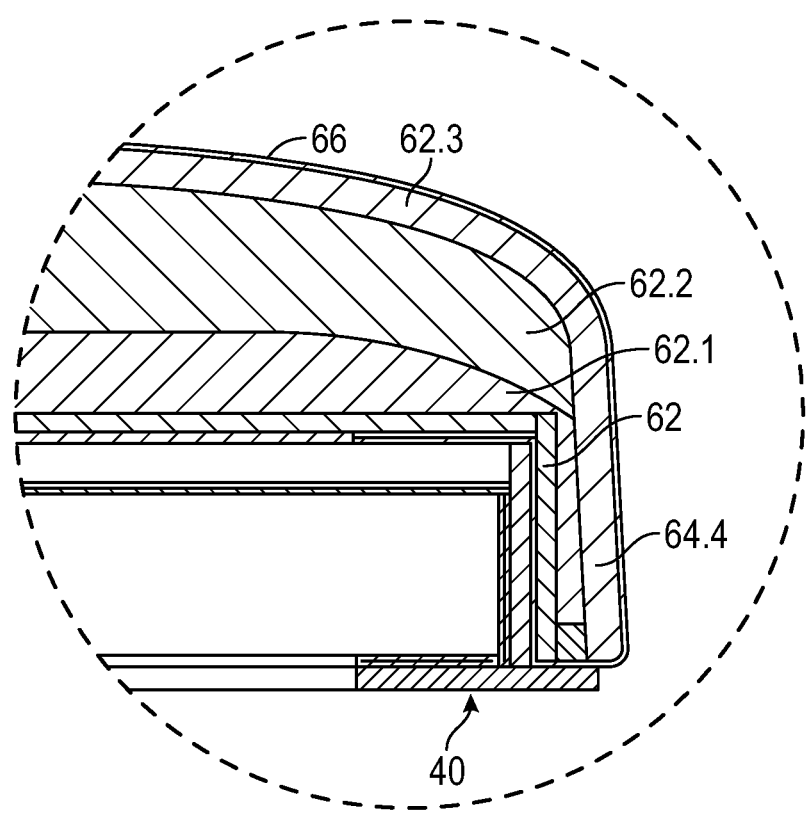
FIG. 15 is a detail within the broken line shown in FIG. 14.

As previously explained, the ottoman cushion 18 is configured to be detachably secured to the table assembly 16. In one embodiment, the ottoman cushion 18 is a loose equipment item that is slidably positioned over the table assembly 16 to conceal the table assembly 16 as shown in FIG. 7 and may be removed and stored elsewhere to reveal the table assembly 16 as shown in FIG. 8. The ottoman cushion 18 includes base frame 40 having an interior cavity 42 formed therein. The size and shape of the interior cavity 42 corresponds to the dimensions of the table assembly 16 such that the platform 24 extends downwardly through a cutout or slot 44 formed in the base frame 40. In an embodiment, the interior cavity 42 is sized to provide a press or friction fit such that the ottoman cushion 18 is removably attached to the table assembly 16. The slot 44 may be cutout to match the contour of the platform 24. As shown in FIGS. 7-8, the width of the slot 44 may vary such that the ottoman cushion 18 does not have to be slide off the entire length of the center leaf section 32.

With reference now to FIGS. 9-15, the base frame 40 includes a foundation 46 having a pair of side walls 48 extending from a top wall 50 that terminate at a lower edge 52 opposite the top wall 50. An outer show surface 54 extends from the lower edge 52 of the side walls 48 and curves upwardly around the ends of the foundation 46, A bottom face 56 is disposed on the lower edge 52 of the side walls 48 to partially enclose the interior cavity 42, which slidably receives the table assembly 16. The bottom face includes a panel 56.1 and a circumferential edge 56.2 extending generally perpendicular from the side walls 48. The interior surfaces of the cavity 42 formed by walls 48, 50 may be lined with a material layer 58 such as felt, suede-like fabric and/or polymeric material (e.g., thermoplastic acrylic-polyvinyl chloride) to protect the table assembly 16 while providing a degree of compliance and friction at the interface between the table assembly 16 and ottoman cushion 18.

The ottoman cushion 18 also includes a cushion assembly 60 releasably secured to the base frame 40. In an embodiment, hook and loop fastening strips 68 are interposed between the base frame 40 and the cushion assembly 60 to detachable secure these two components together. The cushion assembly 60 includes a substrate 62 supporting a foam pad 64. An outer wrap 66 extends around the foam pad 64 and adheres to the substrate 62. In one embodiment, the foam pad 64 is a multi-layered polyurethane cushion providing variable firmness and/or resilience over the cross-section of the cushion assembly 60. For example, the foam pad 64 as illustrated in FIGS. 12-15 may include a first foam layer 64.1, a second foam layer 64.2 and a third foam layer 64.3, each foam layer having different material properties to provide the variable firmness/resilience foam pad. The foam pad 64 may also include a longitudinal side wall 64.4 and a lateral side wall 64.5 that provides transverse support to the foam pad 64. The outer wrap 66 such as leather wraps the multi-layered foam pad to provide an upholstered appearance for the cushion assembly 60.

In the embodiment illustrated in FIGS. 12-15, the foam pad 64 may be fabricated using DAX Firehard Foam available from Skandia, Inc. of Davis Junction, Illinois. The foam pad 64 may include a 1-inch thick first foam layer using DAX 47, a contoured thickness second foam layer using DAX 26, a ½-inch thick third foam layer using DAX 20, a ½-inch thick longitudinal side wall using DAX 55 and a tapered longitudinal lateral side wall using DAX 47 terminating with a ½-inch thick tip using DAX 55. The material properties for these layers are set forth in Table 1 below.

TABLE 1

| | DAX 20 | DAX 26 | DAX 47 | DAX 55 |
|---|---|---|---|---|
| Density (pcf) | 3.2 ± 0.20 | 3.1 ± 0.30 | 3.2 ± 0.20 | 3.2 ± 0.20 |
| Test Method ASTM D3574-25% | 15-25 | 20-30 | 40-50 | 50-60 |
| Support Factor 65/25 | 2.4 min | 2.4 min | 2.4 min | 2.4 min |
| Test Method ASTM 1056 | 1.19-1.99 | 1.59-2.39 | 3.18-3.98 | 3.98-4.77 |
| Resilience (% Rebound) | 36-60 | 57-63 | 54-62 | 54-62 |

With reference again to FIGS. 1-4 and 7-8, a method for configuring the interior fixture will now be described starting from the lowered position shown in FIG. 1. In this position, the post 22 is fully retracted and the table assembly 16 is received in the cavity 42 of the base frame 40 so that the ottoman cushion 18 is positioned adjacent to the seating arrangement 12 and the interior fixture 10 provides a foot rest. To configure the interior fixture 10 into a table, the ottoman cushion 18 is slid laterally (to the right when viewed from the seating arrangement 12 as shown in FIG. 1) toward the aisle until the table assembly 16 reaches the wider section of the slot 44 formed in the bottom face 58 as best seen in FIG. 8. At this point, the ottoman cushion 18 may be lifted vertical off of the table assembly 16 and stowed in the aircraft cabin as loose equipment. In this configuration, the table assembly 16 provides an occasional table similar to a coffee table configuration for the seating arrangement 12 as shown in FIG. 2. To configure the interior fixture 10 as a dining table or standard height work surface, the control element 30 is manipulated for actuating the height adjustment mechanism 26 such that the post 22 telescopically extends to a raised position as shown in FIG. 3. Next, the side leaf section 34 are rotated outwardly until they are arranged in a generally planar position with the center leaf section 32. In this configuration, the table assembly 16 provides a dining table or elevated work surface in front of the seating arrangement 12.

With reference now to FIGS. 16-29, an exemplary embodiment described herein provides an interior fixture 110 similar to the interior fixture 10 heretofore described. The interior fixture 110 includes a base assembly 114 that is positionable between a lowered position and a raised position relative to the floor (not shown), a table assembly 116 supported on the base assembly 114 that is collapsible from a use position to a stowed position, and foldable ottoman 118 that is removably attached to the table assembly 116. Like ottoman 18, the foldable ottoman (or simply ottoman) 118 is configured to be detachably secured to the table assembly 116. Reference is made to the illustrations in FIGS. 1-15 and the description above for further understanding the features of base assembly 114 and table assembly 116, as well as the method for configuring the interior fixture 110.

Figure 16:
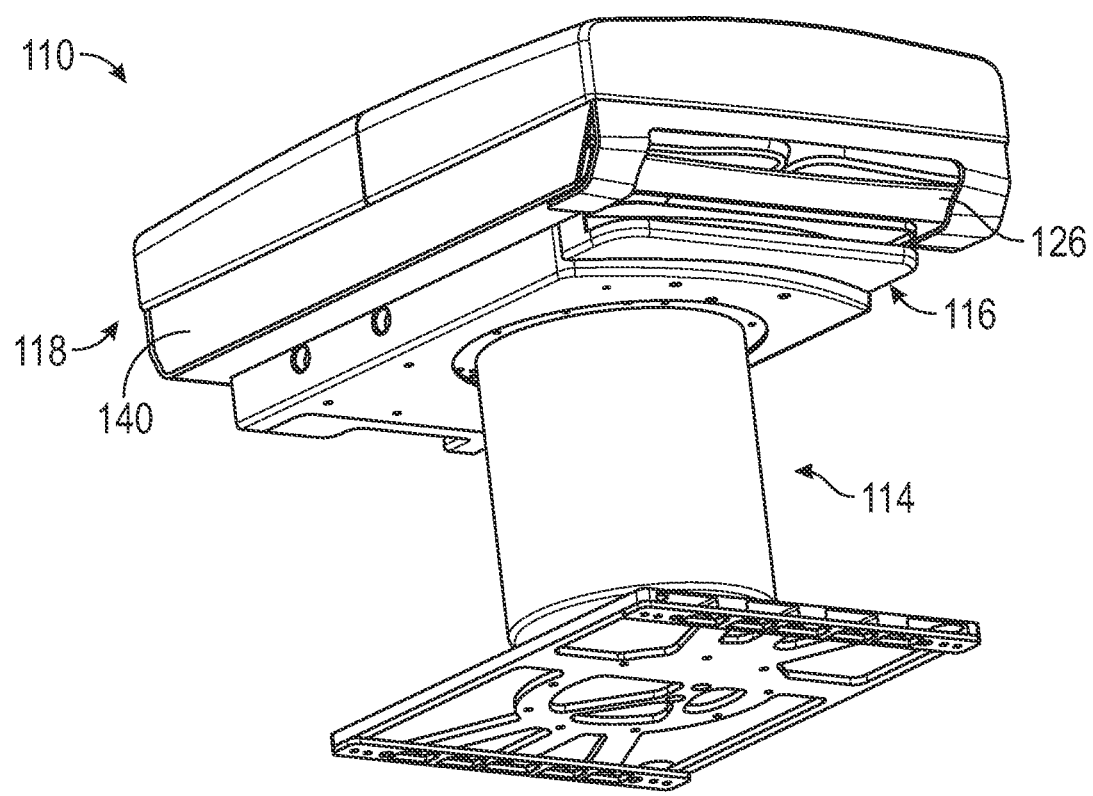
FIG. 16 is a perspective view of an ottoman, similar to that shown in FIG. 8, with a foldable cushion.
Figure 17:
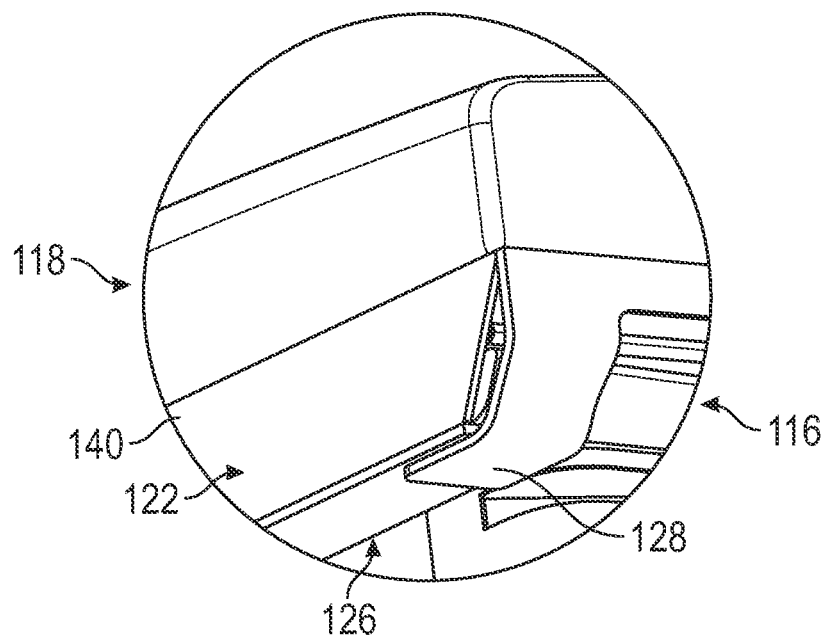
FIG. 17 is a detail of the complaint sleeve of the ottoman shown in FIG. 16.
Figure 22:
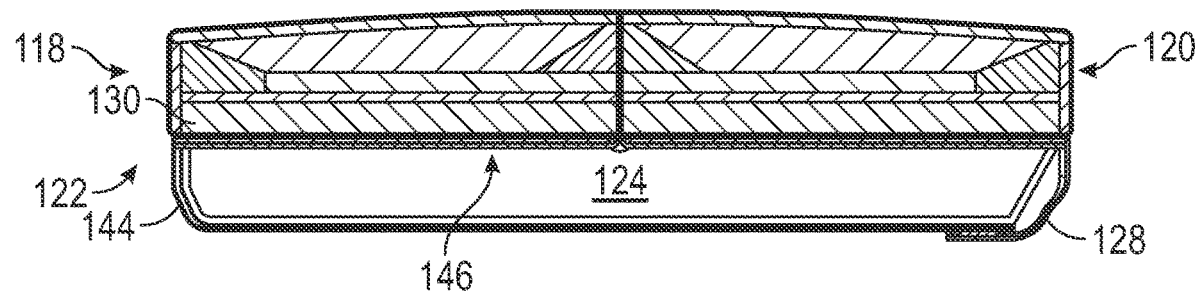
FIG. 22 is a lateral longitudinal cross-section of the ottoman.
Figure 23:
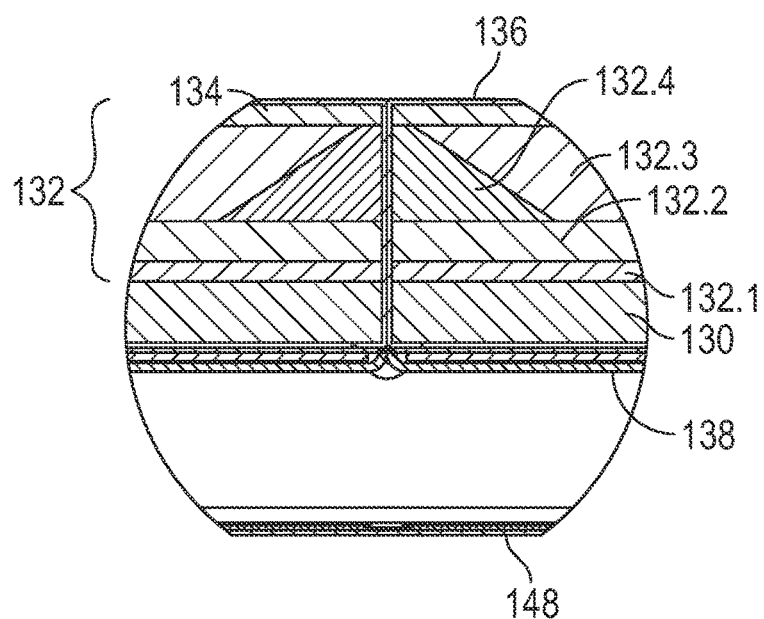
FIG. 23 is a midsection detail of the longitudinal cross-section shown in FIG. 22.
Figure 27:
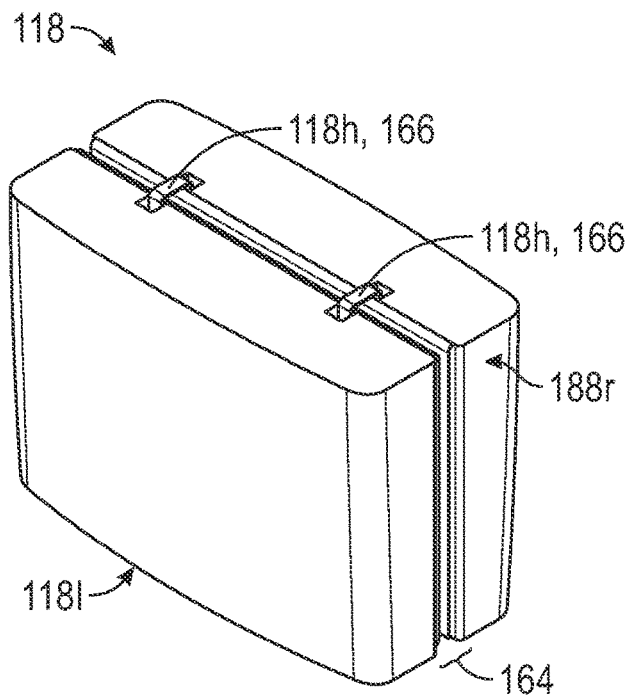
FIG. 27 is a cross-section of the ottoman similar to FIG. 18, showing the cushion in a closed or folded state.

The ottoman 118 is a loose equipment item that is slidably positioned over the table assembly 116 to conceal the table assembly 116 as shown in FIG. 16 and may be removed, folded (as seen in FIG. 27) and stored elsewhere to reveal the table assembly 116. The ottoman 118 includes left and right portions 118*l*, 118*r* coupled together by a hinge assembly 118*h*. Each portion 118*l*, 118*r* of the ottoman 118 has a pad section 120 and a collapsible sleeve 122. While the pad section 120 and the collapsible sleeve 122 may be further referenced as a singular feature, it should be understood that the left and right portions 118*l*, 118*r* each include these features that are substantially the same. The collapsible sleeve 122 defines an interior cavity 124 having a size and shape corresponding to the dimensions of the table assembly 116. When the ottoman is installed on the table assembly 116, a portion of the base assembly 114 extends downwardly through a cutout or slot 126 formed in the sleeve 122. In an embodiment, the sleeve 122 and its interior cavity 124 are sized to provide a snug fit over the table assembly 116. A pair of flaps 128 may be provided at an end of the sleeve 122 to wrap around the table assembly 116 for further securing the ottoman 118 to the table assembly 116.

Figure 26:
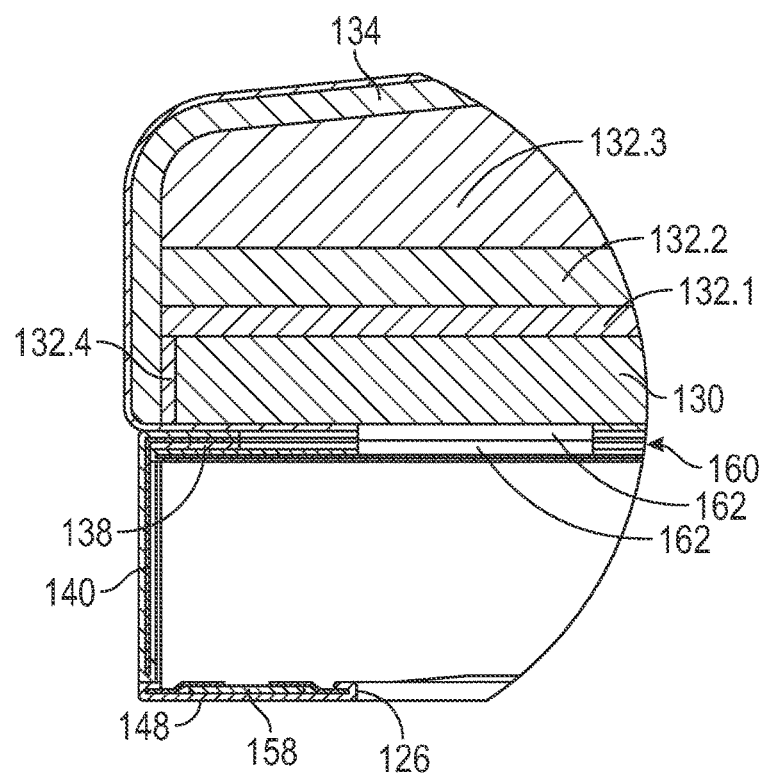
FIG. 26 is a corner detail of the transvers cross-section shown in FIG. 25.

With reference now to FIGS. 18-29, the structural features of the ottoman 118 are further described. The pad section 120 includes a rigid substrate 130 forming a bottom face which supports a foam pad 132 configured as a multi-layered polyurethane cushion providing variable firmness and/or resilience over the cross-section of the foam pad 132. For example, the foam pad 132 as illustrated in FIGS. 18-20 and 25-26 may include a first (high-density) foam layer 132.1, a second (medium-density) foam layer 132.2 and a third (low-density) foam layer 132.3, each foam layer having different material properties to provide the variable firmness/resilience foam pad. The foam pad 132 may also include a longitudinal (high-density) foam side wall 132.4 (FIG. 19) and a lateral (high density) foam side wall 132.5 (FIG. 26) that provides transverse support to the foam pad 132. A (medium-density) foam shell 134 enclosed the foam pad 132 and an outer wrap 136 such as leather wraps the multi-layered foam assembly to provide an upholstered appearance for the pad section 120. Suitable foams for foam pad 132 are further described above in reference to Table 1. The marginal edges of the outer wrap 136 extend around and under the rigid substrate 130 and are secured by suitable means such as adhesive, fasteners stitching or a combination thereof to. a bottom face of the rigid substrate 130 as best seen in FIGS. 19 and 26.

The lined close-out panel 138 forms a top face of the collapsible sleeve 122. The lined side walls 140, 142 and the lined end wall 144 extending downward from the top face form a skirt of the collapsible sleeve 122. The lined stiffener 148 forms a bottom face of the collapsible sleeve 122. Together the top face, skirt and bottom face define the boundary of the interior cavity 124.

The lined close-out panel 138 is configured as a multiple layer component having a contoured stiffener panel 146 lined on each side with a durable wear fabric. As best seen in FIGS. 18, 20 and 21, the contoured stiffener panel 146 has a turned up end along the medial edge. As best seen in FIG. 21, the turned up end of the contoured stiffener panel 146 spaces the close-out panel 138 from the bottom face of the rigid substrate 130 for housing the hinge assembly 118*h* as will be described further below. The contoured stiffener panel 146 and the flat rigid plate 150, described below, are relatively rigid elements (compared to the fabric, foam and leather element) which provide stiffness and support for these other elements, For example, the panel 146 and plate 150 may be constructed using a honeycomb flame resistant material such as DuPont Nomex®.

Figure 24:
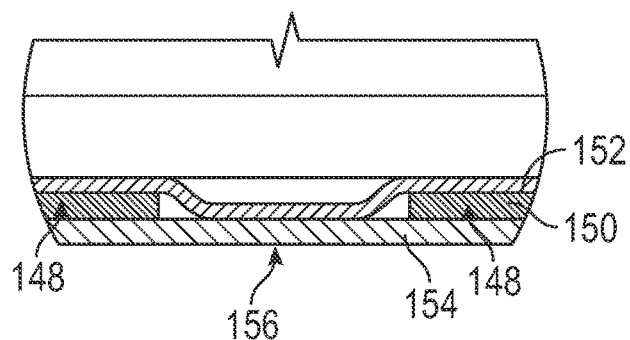
FIG. 24 is a detail view of the fold zone taken along the longitudinal cross-section shown in FIG. 22.
Figure 25:
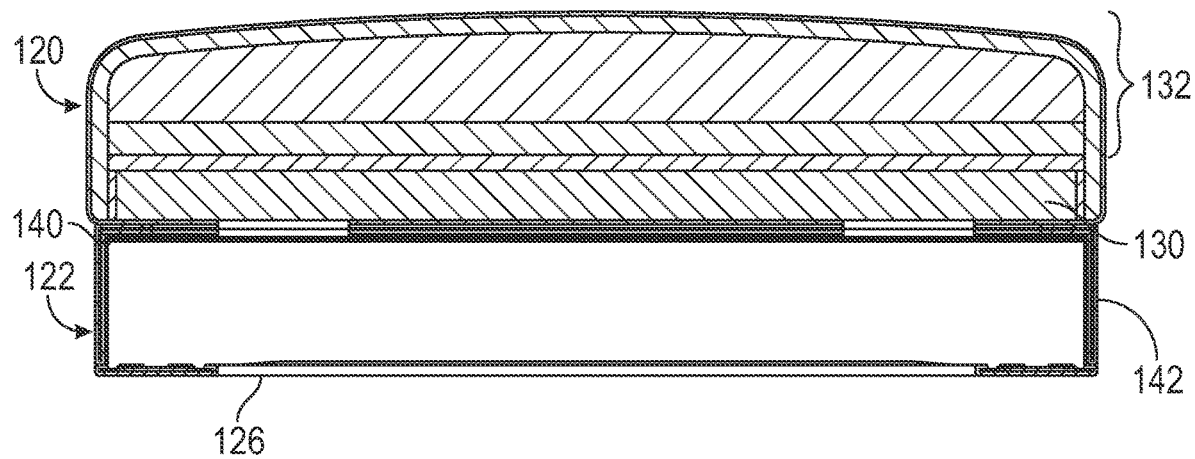
FIG. 25 is a transverse cross-section of the ottoman.

The lined side walls 140, 142 and end wall 144 are configured as multiple layer components having at least an outer show surface (such as leather) and an inner liner providing a durable wear fabric. A lined stiffener plate 148 extend inwardly from the ends of the side walls 140, 142 and the end wall 144 opposite the close-out panel 138. The lined stiffener plate 148 is configured as a multiple layer component having a flat rigid plate 150 lined on one side with a durable wear fabric 152 and covered with an outer show surface 154 (such as leather). As best seen in FIG. 18, the lined stiffener plate 148 forms the slot 126 in the sleeve 122 has previously described. With reference to FIG. 24, a portion of the stiffener plate 148 is removed at the transverse centerline and the inner liner 152 and outer show surface 154 are secured together to form a center fold region 156 below the hinge assembly 118*h*. The marginal edges of the flaps 128, side walls 140, 142 and end wall 144 extend around and over the lateral edges of the stiffener plate 148 and are secured by suitable means such as adhesive, fasteners stitching or a combination thereof to a top face of the stiffener plate 148 as best seen in FIGS. 19 and 26. The flaps 128, the side walls 140, 142, the end wall 144 and the stiffener plate 148 are stitched together to define the interior cavity 124 for receiving the table assembly 116.

As seen in FIG. 16, a steel support 158 may be disposed between the stiffener plate 148 and the marginal edges of the side walls 140, 142 and the end wall 144 extending around a portion of the outer perimeter of the sleeve 122 to provide additional stiffness to the ottoman 118. The bottom surface of rigid substrate 130 and the top surface of the contoured stiffener panel 146 define an interface 160 between the pad section 120 and the sleeve 122 of the ottoman 118. As best seen in FIG. 26, fasteners 162 such as hook and loop fastener combination are disposed at the interface for releasably securing the pad section 120 to the sleeve portion 122.

As mentioned above, the ottoman 118 is foldable when it is separated from the table assembly 116. In the folded state, the left and right portions 118*l*, 118*r* rotate relative to each other such that the pad section 120 is outward facing as illustrated in FIG. 27. In this state, the collapsible sleeve 122 (only the close-out panels 138 being illustrated in FIGS. 27 and 28) will be disposed in a gap 164 formed between the left and right close-out panels 138*l*, 138*r*. In other words, the collapsible sleeve 122 is accommodated within the gap 164 when the ottoman is in a folded state. The kinematics of the hinge assembly 118*h* are such that the gap 164 is formed as the ottoman 118 is folded. Specifically, pivot axes $P_1$, $P_2$ for the left and right portions 118*l*, 118*r* are offset relative to one another and the distance between these pivot axes $P_1$, $P_2$ define the width of the gap 164 formed therebetween.

Figure 28:
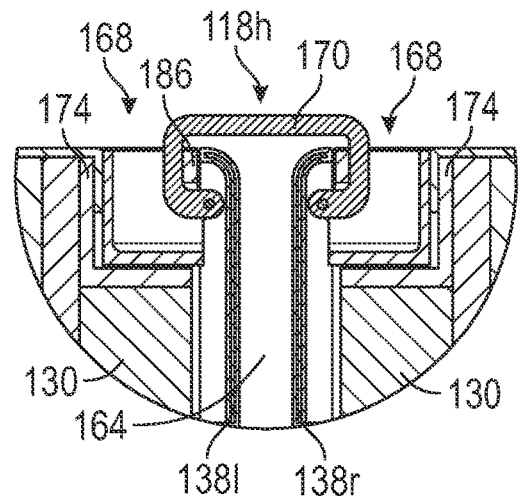
FIG. 28 is a detail of the hinge assembly of the ottoman in the folded state.
Figure 29:
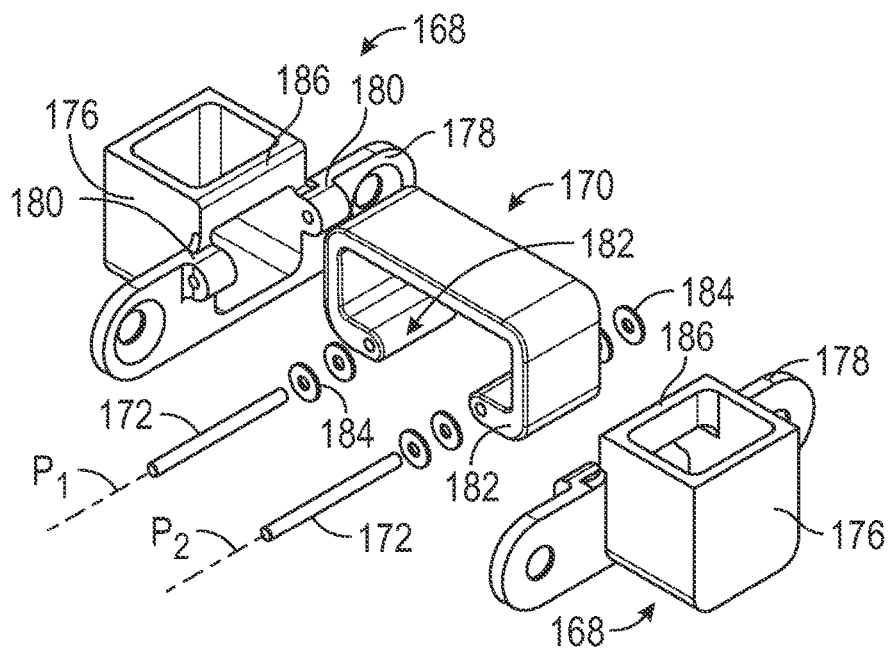
FIG. 29 is an expanded view of the components of the hinge assembly.

In the embodiment illustrated in FIGS. 27-29, the hinge assembly 118*h* includes two pocketed link hinge mechanisms 166 disposed between the medial edges of the left and right 118*l*, 118*r* portions of the ottoman 118. Each hinge mechanism 166 has first and second pocket hinge plates 168 and a hinge link 170 pivotable connected to the pocket hinge plates 168 by hinge pins 172. The hinge mechanism 166 also includes an insert 174 located on the medial edge of the rigid substrate 130. The insert 174 may include a fin (not shown) which extends into and is secured to the adjacent foam layer 132.1 to further support the insert 174 in the pad portion 120.

Each pocket hinge plate 168 is disposed in and secured to an insert 174. In particular, a pocket portion 176 of the pocket hinge plate 168 is disposed in a recess formed in the rigid substrate 130, a plate portion 178 of the pocket hinge plate 168 is secured to the insert 174 and a pair of knuckles 180 are formed on the plate portion 178 adjacent the pocket portion 176. The hinge link 170 is a C-shaped link having a knuckle 182 formed at each end thereof. Each hinge pin 172 extends through the knuckles 180, 182 to pivotally coupled the hinge plates 168. In this configuration, the left portion 118*l* of the ottoman 118 rotates relative to the hinge link 170 about a first pivot axis $P_1$ and the right portion 118*r* of the ottoman 118 rotates relative to the hinge link 170 about a second pivot axis $P_2$. Nylon washers 184 may be positioned on the hinge pins 172 between the knuckles 180, 182.

In the folded state, the hinge link 170 extends out of the pocket portion 176 of the hinge plates 168 and hold the left and right portions 118*l*, 118*r* of the ottoman 118 in a spaced apart relation, thereby defining the gap 164 therebetween as best seen in FIG. 28. A bridge section 186 extending across the pocket portion 176 engages the hinge link 170 and functions as a stop to maintain the gap 164 in the folded state. During the folding motion, the sleeve 122 folds along the center fold region 156 and collapses into the gap 164. In the open state, the hinge link 170 rotates into the pocket portion 176 allowing the left and right portions 118*l*, 118*r* of the ottoman 118 to be positioned in a side-by-side relation as best seen in FIGS. 18 and 21.

While the interior fixtures 10, 110 are shown and described in the context of an aircraft ottoman with convertible table function, one skilled in the art should appreciate that applications and variations to the interior fixture are contemplated such that the detailed description is not intended to limit the scope, applicability, or configuration of the disclosure in any way. For example, the seating arrangement is shown as a single, forward-facing seat. However, the interior fixture may be readily to other seating arrangements including but not limited to multiple, forward-facing seats or a pair of seating arrangements including a forward-facing seat and a rearward-facing seat with the interior fixture 10, 110 located therebetween. In this way, the foregoing detailed description will provide those skilled in the art with a convenient road map for implementing an exemplary embodiment of the disclosure. It being understood that various changes may be made in the function and arrangement of elements described in an exemplary embodiment without departing from the scope of the disclosure as set forth in the appended claims.

What is claimed is:

1. A configurable interior fixture for a vehicle comprising:
   a base assembly including a vertical post;
   a horizontal support disposed on the post; and
   a stowable cushion having a pad section and a collapsible sleeve forming an interior cavity configured to receive the horizontal support when the stowable cushion is in a use state;
   wherein the interior fixture is configured as an ottoman when the horizontal support is received in the interior cavity of the collapsible sleeve for detachably securing the pad section to the base assembly; and
   wherein the interior fixture is configured as a table when the ottoman is detached from the table assembly and stowed to reveal the horizontal support.

2. The configurable interior fixture according to claim 1, wherein the stowable cushion further comprises first and second pad portions pivotally connected along a medial edge with a hinge assembly, wherein the collapsible sleeve is disposed in a gap formed between the first and second pad section when the stowable cushion is in a folded state.

3. The configurable interior fixture according to claim 2, wherein the hinge assembly further comprises:
   a first hinge plate secured to the first pad portion, the first hinge plate having a first pocket portion and a first plate knuckle;
   a second hinge plate secured to the second pad portion, the second plate having a second pocket portion and a second plate knuckle;
   a hinge link having a first link knuckle pivotally coupled to the first plate knuckle with a first hinge pin and a second link knuckle pivotally coupled to the second plate knuckle with a second hinge pin;
   wherein a first pivot axis defined by the first pivot pin is offset relative a second pivot axis defined by the second pivot pin and the distance between the first and second pivot axes defines a width of the gap formed between the first and second pad portions.

4. The configurable interior fixture according to claim 3, wherein the hinge link further comprises a C-shaped link having the first link knuckle formed at a first end of the C-shape link and the second link knuckle formed at a second end of the C-shaped link.

5. The configurable interior fixture according to claim 4, wherein each of the first and second hinge plates comprises a pocket portion configured to receive the C-shaped link when the stowable cushion is in the use state.

6. The configurable interior fixture according to claim 5, wherein each of the first and second hinge plates comprises a bridge extending across the pocket portion for engaging C-shaped link when the stowable cushion is in the folded state.

7. The configurable interior fixture according to claim 2, wherein the collapsible sleeve further comprises:
   a top face of the collapsible sleeve includes a close-out panel;
   a pair of side walls and an end wall extending downwardly from the close-out panel forming a skirt of the collapsible sleeve;
   a bottom face of the collapsible sleeve includes a stiffener plate; and
   a flap extending downwardly from the close-out panel opposite the end wall;
   wherein the interior cavity is formed by the close-out panel, the skirt and the stiffener plate for receiving the horizontal support and the flap is releasably attachable to the stiffener plate for securing the stowable cushion onto the horizontal support.

8. The configurable interior fixture according to claim 7, wherein the stiffener plate comprises is divided into a first plate portion and a second plate portion along a medial edge defining a center fold region, wherein the collapsible sleeve is configured to fold at the center fold region.

9. The configurable interior fixture according to claim 1, wherein the collapsible sleeve further comprises:
   a top face of the collapsible sleeve includes a close-out panel;
   a pair of side walls and an end wall extending downwardly from the close-out panel forming a skirt of the collapsible sleeve;
   a bottom face of the collapsible sleeve includes a stiffener plate; and
   a flap extending downwardly from the close-out panel opposite the end wall;
   wherein the interior cavity is formed by the close-out panel, the skirt and the stiffener plate for receiving the horizontal support and the flap is releasably attachable to the stiffener plate for securing the stowable cushion onto the horizontal support.

10. The configurable interior fixture according to claim 1, wherein the pad section is releasably secured to the collapsible sleeve at an interface therebetween.

11. The configurable interior fixture according to claim 1, the pad section further comprising a cushion having a substrate, a foam pad supported on the substrate and an outer wrap extending around the foam pad and secured to the substrate.

12. The configurable interior fixture according to claim 11, the cushion comprising a multi-layered cushion including a first layer of foam material supported on the substrate, a second layer of foam material supported on the first layer and a third layer of foam material supported on the second layer, wherein each foam layer has a different material property for varying a firmness of the foam pad.

13. The configurable interior fixture according to claim 12, the multi-layered cushion further comprising a longitudinal side wall and a lateral side wall providing transverse support to the cushion.

14. A configurable interior fixture for a vehicle comprising:
   a base assembly including a post having a platform disposed on a first end thereof,
   a table assembly having a center leaf section supported on the platform and extending in a generally horizontal orientation; and
   an ottoman having a pad section and a collapsible sleeve forming an interior cavity configured to receive the table assembly when the ottoman is in a use state;
   wherein the interior fixture is configured as a foot rest when the table assembly is in the stowed position and received in the interior cavity of the collapsible sleeve to detachably secure the pad section to the base assembly; and
   wherein the interior fixture is configured as a table when the ottoman is detached from the table assembly and the table assembly is in the use position.

15. The configurable interior fixture according to claim 14, wherein the ottoman further comprises first and second pad portions pivotally connected along a medial edge with a hinge assembly, wherein the collapsible sleeve is disposed in a gap formed between the first and second pad section when the ottoman is in a folded state.

16. The configurable interior fixture according to claim 15, wherein the hinge assembly further comprises:
   a first hinge plate secured to the first pad portion, the first hinge plate having a first pocket portion and a first plate knuckle;
   a second hinge plate secured to the second pad portion, the second plate having a second pocket portion and a second plate knuckle;
   a hinge link having a first link knuckle pivotally coupled to the first plate knuckle with a first hinge pin and a second link knuckle pivotally coupled to the second plate knuckle with a second hinge pin;
   wherein a first pivot axis defined by the first pivot pin is offset relative a second pivot axis defined by the second pivot pin and the distance between the first and second pivot axes defines a width of the gap formed between the first and second pad portions.

17. The configurable interior fixture according to claim 14, wherein the pad section is releasably secured to the collapsible sleeve at an interface therebetween.

18. The configurable interior fixture according to claim 14, the post comprising a height adjustment mechanism extending between a base plate and the platform and a telescoping cover extending over the height adjustment mechanism from the platform to the base, wherein the telescoping cover extends and retracts in coordination raising and lowering the height adjustment mechanism.

19. The configurable interior fixture according to claim 14, the table assembly further comprising at least one side leaf section operably coupled to the center leaf section, wherein the side leaf section is moveable between a stowed position on top of the center leaf section and a use position extending in a generally planar orientation from an edge of the center leaf section.

20. The configurable interior fixture according to claim 14, the table assembly further comprising a first leaf section operably coupled along a first edge of the center leaf section and a second leaf section operably coupled along a second edge of the center leaf section opposite the first edge, wherein the first and second side leaf sections are moveable between a stowed position on top of the center leaf section and a use position extending in a generally planar orientation from the first and second edges, respectively.

* * * * *